United States Patent
Bednarz

(10) Patent No.: US 7,377,137 B1
(45) Date of Patent: May 27, 2008

(54) BARREL LOCK WITH INFINITE AXIAL ADJUSTMENT

(76) Inventor: James W. Bednarz, 1025 W. Crosby, Slaton, TX (US) 79364

( * ) Notice: Subject to any disclaimer, the term of this patent is extended or adjusted under 35 U.S.C. 154(b) by 274 days.

(21) Appl. No.: 11/260,353

(22) Filed: Oct. 27, 2005

(51) Int. Cl.
*E05B 67/36* (2006.01)

(52) U.S. Cl. .............. 70/34; 70/386; 411/348; 403/322.2

(58) Field of Classification Search .......... 70/32–34, 70/386, 164; 411/348, 355; 403/322.2, 403/343
See application file for complete search history.

(56) References Cited

U.S. PATENT DOCUMENTS

| | | | |
|---|---|---|---|
| 1,244,848 A | 10/1917 | Gadke | |
| 2,232,340 A | 2/1941 | Olson | |
| 2,261,505 A * | 11/1941 | Schlesinger | 403/106 |
| 2,822,986 A | 2/1958 | Schreier | |
| 3,180,390 A | 4/1965 | Ockert, Jr. | |
| 3,390,712 A | 7/1968 | McKay | |
| 3,498,653 A | 3/1970 | McCreery | |
| 3,608,937 A * | 9/1971 | Nave | 403/57 |
| 4,699,408 A | 10/1987 | Kesselman | |
| 4,733,584 A | 3/1988 | Karge | |
| 4,793,164 A * | 12/1988 | Sloop, Sr. | 70/164 |
| 5,007,258 A * | 4/1991 | Mahaney | 70/159 |
| 5,160,180 A * | 11/1992 | Mlynarczyk | 292/252 |
| 5,542,273 A | 8/1996 | Bednarz | |
| 5,653,486 A * | 8/1997 | Stillwagon | 292/252 |
| 5,895,188 A * | 4/1999 | Cheng | 411/433 |
| 6,012,744 A * | 1/2000 | Wilson et al. | 285/288.1 |
| 6,152,645 A * | 11/2000 | Sanford | 403/328 |
| 6,343,808 B1 * | 2/2002 | Luh | 280/511 |
| 6,554,524 B1 * | 4/2003 | Smith | 403/78 |
| 6,595,714 B2 * | 7/2003 | Moore | 403/322.2 |
| 6,813,918 B2 | 11/2004 | Reese | |
| 2005/0044907 A1 * | 3/2005 | Agbay | 70/164 |

* cited by examiner

*Primary Examiner*—Suzanne D Barrett
(74) *Attorney, Agent, or Firm*—Robert J. Harter

(57) ABSTRACT

A barrel lock for locking various utilities devices such as valves, meters, or enclosures associated with the control or distribution of gas, water or electricity includes a shank with a single driven ball that can be forced radially outward from the shank to lock onto a cap-like retainer such that the utilities device is restrained between the retainer and an enlarged head of the shank. Preferably, only a single driven ball is used to concentrate the clamping force at a single point, thereby creating an exceptionally high clamping pressure. For even greater clamping force, an accurately and strategically positioned end stop allows a drive ball to push against the driven ball at an extremely shallow angle of attack while preventing the two balls from accidentally toggling over center and irreversibly locking up. The barrel lock has infinite variable adjustment in an axial direction to fit a wide variety of devices.

20 Claims, 8 Drawing Sheets

BARREL LOCK WITH INFINITE AXIAL ADJUSTMENT

BACKGROUND OF THE INVENTION

1. Field of the Invention

The subject invention generally pertains to barrel locks and more specifically to a barrel lock actuated by a ball and mandrel.

2. Description of Related Art

Barrel locks are typically used for preventing unauthorized personnel from tampering with public utility devices such as valves and meters for gas, water and electricity.

Many barrel locks comprise a shank with a head at one end and a locking mechanism at the opposite end. The locking mechanism typically includes two or more balls that can be forced to protrude radially outward beyond the outside diameter of the shank. A mandrel inside the shank, and actuated by a separate key, forces the balls outward or allows the balls to retract depending on which direction the mandrel is rotated.

To lock a utilities device, the device requires a feature for receiving the barrel lock. A gas valve, for instance, may include a tab extending from the valve's housing and another one extending from the valve's handle. Each tab would have a hole so that when the handle is rotated to a closed position, the holes become aligned to receive the shank of the barrel lock, which inhibits the handle from rotating the valve back open.

To prevent someone from simply withdrawing the shank from within the holes, the end of the shank with the locking mechanism protrudes beyond the two tabs, and a close-fitting, cap-like retainer is placed over that end of the shank and locked there. In order to place the retainer on the end of the shank, the balls first need to be retracted within the shank, due to the close fitting clearance between the outside diameter of the shank and the inside diameter of the retainer. Once the retainer is on the end of the shank, the key is used to rotate the mandrel, which forces the balls outward to extend into an annular groove that is inside the retainer, thereby locking the retainer to the shank and capturing the two tabs between the retainer and the head of the barrel lock.

There is a problem, however, with such barrel locks. There are a wide variety of utilities devices but not nearly as many different size barrel locks, so in some applications, the barrel lock may not fit as tightly as it should. Excessive axial clearance may exist underneath the shank's head or between one of the valve's tabs and the retainer. If sufficiently large, such clearance could allow a pry bar to be inserted underneath the head or the retainer to force the barrel lock apart.

To address this problem, some retainers have two axially spaced apart annular grooves, so the axial distance between the head and the retainer is determined by which groove is selected to receive the balls of the locking mechanism. Although this provides some adjustability, the discrete steps of adjustment are far too crude to effectively solve the problem. Consequently, a need still exists for an adjustable barrel lock that can tightly fit a wide variety of devices.

SUMMARY OF THE INVENTION

To provide a better barrel lock, an object of some embodiments is to provide a barrel lock with infinite axial adjustment.

Another object of some embodiments is to maximize a barrel lock's radial thrust by having one ball drive another to an extremely shallow angle made possible by providing the drive ball with an accurately and strategically positioned end stop.

Another object of some embodiments is to provide a barrel lock with an angled end stop for the drive ball so that the driven ball is forced radially outward an extra distance in reaction to the drive ball encountering the end stop's angled surface.

Another object of some embodiments is to enable a barrel lock to form its own ball-locking dimple for infinite axial adjustment, and later allow the barrel lock to be withdrawn and reinstalled using the same dimple or forming another one at a different axial location.

Another object of some embodiments is to use the rotational movement of a drive ball and a driven ball to help draw the shank of the barrel lock into its retainer.

Another object of some embodiments is using the binding nature of hardened steel to help lock a retainer to a shank of a barrel lock.

Another object of some embodiments is to adjust the axial spacing between the retainer and the head of the barrel lock's shank by rotating the shank relative to the retainer, and then locking the shank in place by rotating a mandrel inside the shank.

Another object of some embodiments is to provide the shank with a thread-biting tooth that can engage internal threads or a spiral groove inside the retainer to help lock the shank and retainer together.

Another object of some embodiments is to provide a retainer with a spiral groove into which a driven ball can be forced. The ball engaging the spiral groove provides three functions: 1) it provides a way to axially adjust the barrel lock, 2) it helps hold the shank and retainer together, and 3) it gets progressively tighter as the barrel lock is driven to its locked position.

Another object of some embodiments is to screw a shank into a retainer to axially adjust and clamp a barrel lock, and then rotate a mandrel inside the shank to lock the retainer and shank in position.

Another object of some embodiments is to use a barrel lock to lock the door of an electrical enclosure, wherein the barrel lock draws the door progressively tighter as the barrel lock it driven to its locked position.

Another object of some embodiment is to push a single driven ball into engagement with a retainer so as to concentrate the contact pressure against the retainer, whereby the concentrated pressure promotes desirable binding and/or dimpling that helps lock the device.

Another object of some embodiment is to maximize the radial thrust of the driven ball by minimizing the ratio of the driven ball's radial movement to the corresponding rotation of the ball-driving mandrel.

Another object of some embodiments it to promote dimpling of the retainer by making the retainer softer than the driven ball, yet make both of them of steel for security.

One or more of these and/or other objects of the invention are provided by a high pressure, radially extendable ball style barrel lock that includes a shank that fits into a retainer. The barrel lock includes a feature that makes the lock infinitely adjustable (as opposed to incrementally) within a limited range of adjustability.

DESCRIPTION OF THE PREFERRED EMBODIMENT

Figure 1:
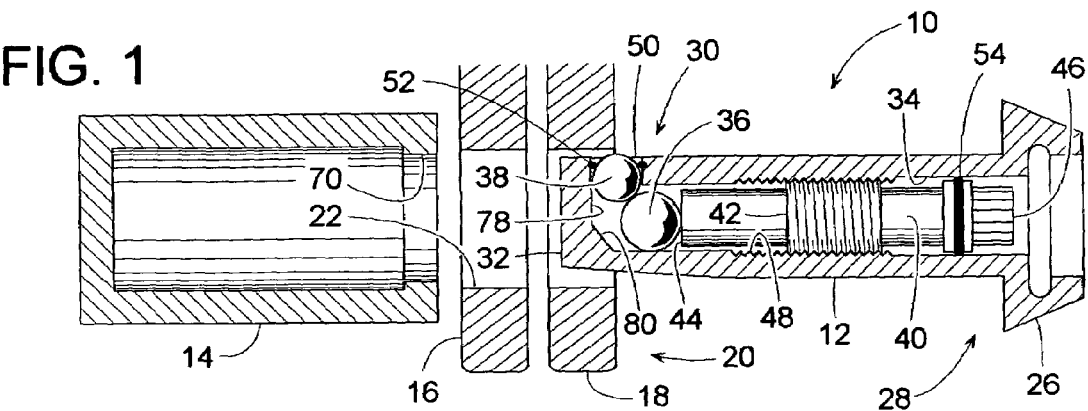
FIG. 1 is a cross-sectional view taken along a longitudinal centerline of a barrel lock that is about to secure two parts.

A barrel lock 10, shown in FIGS. 1-6, comprises a shank 12 and a retainer 14 that can be locked together to limit the relative movement of two parts 16 and 18 of a utilities device 20. Examples of device 20 include, but are not limited to, a valve, meter, or enclosure associated with the control or distribution of gas, water or electricity.

For the sake of example, the invention will be described with reference to device 20 being a valve that has a first tab (part 16) rigidly extending from a body of the valve and a second tab (part 18) extending from the valve's handle, which is used for operating the valve. Parts 16 and 18 each have a hole 22 and 24 that when aligned allow shank 12 to be inserted through the holes. Inserting shank 12 through the tabs' holes inhibits the valve's operation, and locking retainer 14 onto shank 12 prevents unauthorized removal of shank 12. For security, both shank 12 and retainer 14 are preferably made of steel or some other tamper resistant metal.

In some embodiments of the invention, shank 12 comprises a head 26 at an upper end 28 of the shank, and a locking mechanism 30 at a lower end 32. Upper end 28 is open to a shank bore 34 inside the shank. A drive ball 36, a driven ball 38 (both preferably made of tamper resistant steel), and a drive pin 40 can be disposed inside shank 12 by inserting them through upper end 28. Drive pin 40 has a threaded portion 42 between a drive end 44 and a driven end 46 of pin 40. The pin's threaded portion 42 screws into a threaded bore 48 of shank 12. Driven ball 38 can move within a side hole 50 in shank 12, and drive ball 36 is situated between driven ball 38 and drive end 44. Turning pin 40, via a key removably attached to driven end 46 (see U.S. Pat. No. 5,542,273), forces driven ball 38 to protrude radially outward from within shank 12 or allows driven ball 38 to retract, depending on which direction pin 40 is rotated. Drive ball 36 significantly increases the outward thrust of driven ball 38 for reasons that will be explained later. O-rings 52 and 54 can be added to protect the inner workings of shank 12 from dirt, moisture and other contaminants. Additional basic information that may apply to barrel lock 10 can be found in U.S. Pat. No. 5,542,273, which is specifically incorporated by reference herein.

FIGS. 1-4 could be considered a typical sequence of operation of barrel lock 10. In FIG. 1, parts 16 and 18 are aligned at the valve's closed position so that shank 12 can be inserted through holes 22 and 24. Shank 12 is inserted through the holes, and retainer 14 is placed over the shank's lower end 32. In order to do this, drive pin 40 may need to be partially unscrewed to an unlock position (FIGS. 1, 2 and 4) away from lower end 32 so that driven ball 38 can retract to a retracted position (FIGS. 1, 2 and 3) to provide the necessary annular clearance between a maximum outside diameter 56 of shank 12 and a minimum inside diameter 58 or throat diameter of retainer 14.

Figure 2:
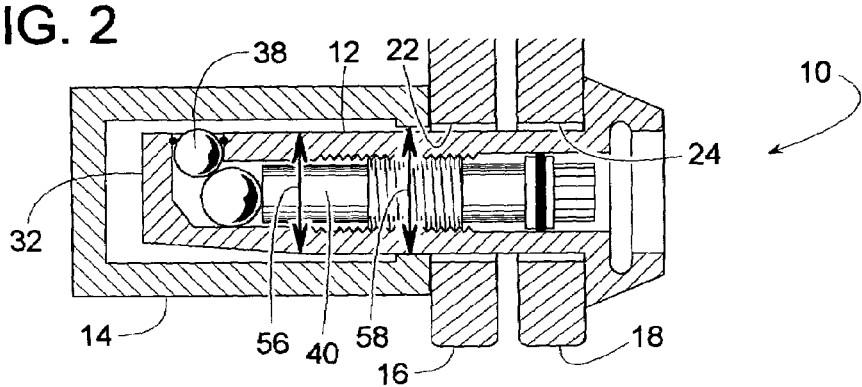
FIG. 2 is a cross-sectional view similar to FIG. 1 but showing the barrel lock assembled but not yet secured.

FIG. 2 shows barrel lock 10 installed but not yet locked. To lock shank 12 in place, pin 40 is screwed farther into shank 12 to a lock position (FIG. 3) to push drive ball 36 toward lower end 32, thereby forcing drive ball 36 to push driven ball 38 outward to an extended position (FIG. 3) against an inner wall 60 of retainer 14. Driven ball 38 pressing against retainer 14 forces shank 12 to tilt relative to retainer 14. The relative tilting between shank 12 and retainer 14 can also be seen in FIG. 5, which shows a longitudinal centerline 86 of pin 40 being at a slight angle 89 to a longitudinal centerline 87 of retainer 14. In some cases, a backside 62 of shank 12 may need to be relieved or beveled to provide sufficient radial clearance between shank 12 an inner bore diameter 64 of retainer 14 so that shank 12 has room to tilt within retainer 14. Tilting shank 12 to the strained position of FIG. 3 creates a two-point binding action (frictional binding forces at points 66 and 68) between shank 12 and a throat 70 of retainer 14.

In cases where driven ball 38 is driven with sufficient force and is perhaps harder than inner wall 60, driven ball 38 may even form a beneficial dimple 72 (FIG. 4) in wall 60. Driven ball 38 extending into dimple 72 and/or shank 12 binding against throat 70 helps lock shank 12 to retainer 14. Even if unauthorized personnel attempts to pry or otherwise forcibly pull shank 12 out from within retainer 14 while driven ball 38 is still extended, ball 38 may eventually catch on a step 74 between bore diameter 64 and the smaller throat diameter 58, which would greatly increase the force required to completely separate shank 12 and retainer 14.

To properly unlock barrel lock 10, pin 40 is rotated in a direction that moves pin 40 away from lower end 32. This allows driven ball 38 to retract so that shank 12 can tilt back to its relaxed position of FIG. 4 and be readily removed from within retainer 14, as indicated by arrow 76. In future use, dimple 72 can be reused, or driven ball 38 can form another dimple.

When locking shank 12 to retainer 14, one or more interesting phenomena come into play, such as 1) an extremely high radial thrust of driven ball 38, 2) the high binding force created between shank 12 and throat 70, 3) an axial drawing action made possible by the rotation of a single driven ball 38, and 4) an end stop 78 with an optional angled cam surface 80 that in some cases provides driven ball 38 with extra radial push as drive ball 36 engages surface 80.

Figure 3:
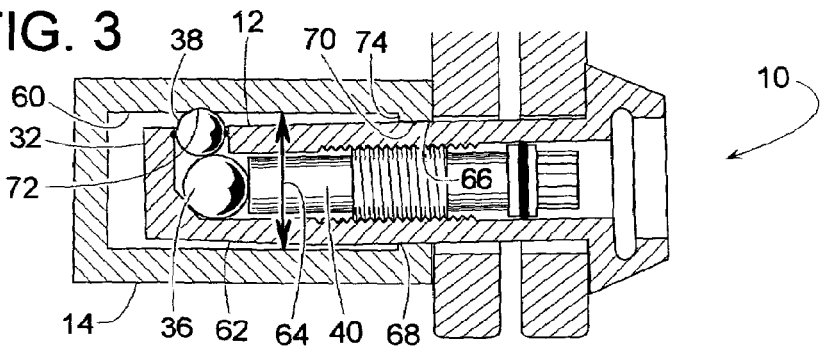
FIG. 3 is a cross-sectional view similar to FIG. 2 but showing the barrel lock secured.
Figure 4:
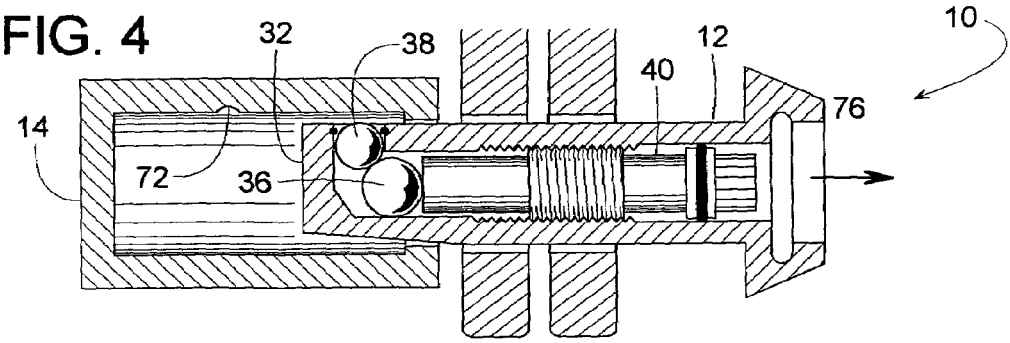
FIG. 4 is a cross-sectional view similar to FIGS. 1-3 but showing the shank being removed after having once been locked onto its retainer.
Figure 5:
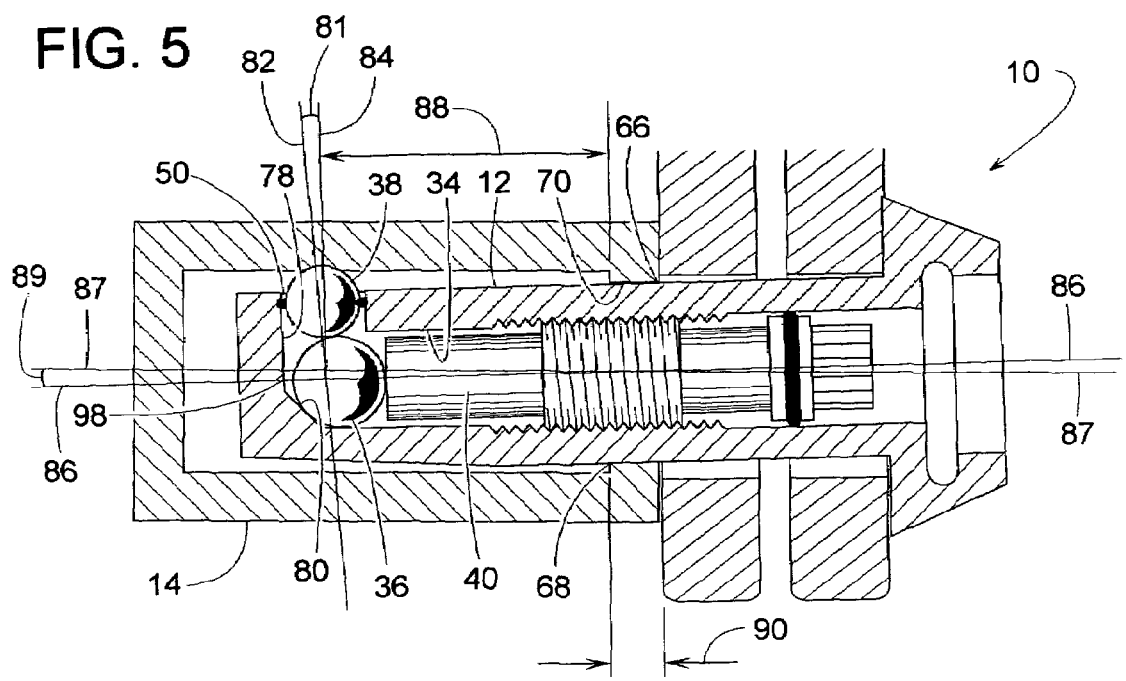
FIG. 5 is an enlarged view of FIG. 3 showing various angles and dimensions.

Referring to FIG. 5, which is an enlarged view of FIG. 3, the extremely high radial thrust of driven ball 38 is created by having a very low ratio of the driven ball's radial movement to the corresponding rotation of drive pin 40. In some cases, a 90-degree rotation of pin 40 moves driven ball 38 less than 0.004-inches somewhat near the driven ball's end of outward travel. This low ratio and high thrust is partially due to a very acute, predetermined minimum angle 81 created between a ball-to-ball line 82 and a radial line 84 that is perpendicular to longitudinal centerline 86 of drive pin 40. The predetermined minimum angle 81 is preferably less than 15-degrees and in some cases is less than 6-degrees.

To achieve the mechanical advantage of such a low angle of attack while preventing balls 36 and 38 from irreversibly locking up by toggling over center (i.e., angle 81 getting too close to zero degrees), end stop 78 is strategically and accurately situated within shank 12. In some embodiments, end stop 78, which in this example includes the optional tapered surface 80, is created by drilling side hole 50. In other words, a portion of end stop 78 is simply an extension of hole 50. If desired, tapered surface 80 can be created by drilling bore 34 in shank 12, wherein the tapered surface 80 corresponds to the point of the drill used for drilling bore 34. Drive ball 36 is preferably, but not necessarily, larger than driven ball 38 so that when both balls 36 and 38 lie against side hole 50 (i.e., both balls are against the far left vertical side of hole 50 and end stop 78 as viewed in FIG. 5), the center points of balls 36 and 38 will not be parallel to that far left vertical side of hole 50 and end stop 78, thus the balls are still prevented from toggling over center and locking up. Under normal operation, drive ball 36 stops moving deeper into bore 34 upon engaging tapered surface 80 of end stop 78, as shown in FIG. 5. Under worn or otherwise unusual conditions, pin 40 might continue pushing drive ball 36 along surface 80 until ball 36 solidly abuts the far left side of hole 50 and end stop 78. Drive ball 36 moving along surface 80 toward the far left side of end stop 78 forces driven ball 38 to protrude a little farther out through side hole 50.

Although end stop 78 is shown to engage drive ball 36, it is also well within the scope of the invention to have the end stop be some other feature that engages pin 40 rather than ball 36. The end stop, for example, could be where a shoulder or protrusion on pin 40 could engage a complementary shoulder on shank 12 to limit the axial travel of pin 40 and thus limit the travel of ball 36, wherein the complementary shoulder would serve as the end stop instead of end stop 78. End stop 78 and the complementary shoulder could be used as alternatives of each other or they could both be used in the same barrel lock. As another alternative to end stop 78 and the complementary shoulder, or in addition to them, internal threads 48 of shank 12 could bottom out on external threads 42, thereby providing an end stop that would limit the axial travel of pin 40 and thus limit the travel of ball 36.

Still referring to FIG. 5, the ratio of a first distance 88 between driven ball 38 and throat 70 and a second distance 90 of the axial length of throat 70 is relatively large to provide a mechanical leverage advantage that creates a significant two-point binding force between shank 12 and throat 70 even if the radial thrust of driven ball 38 is relatively low. The radial thrust of driven ball 38, however, is not low, but instead the force is quite high for the reasons explained in the previous paragraph; therefore, the two-point binding force is tremendous.

Figure 6:
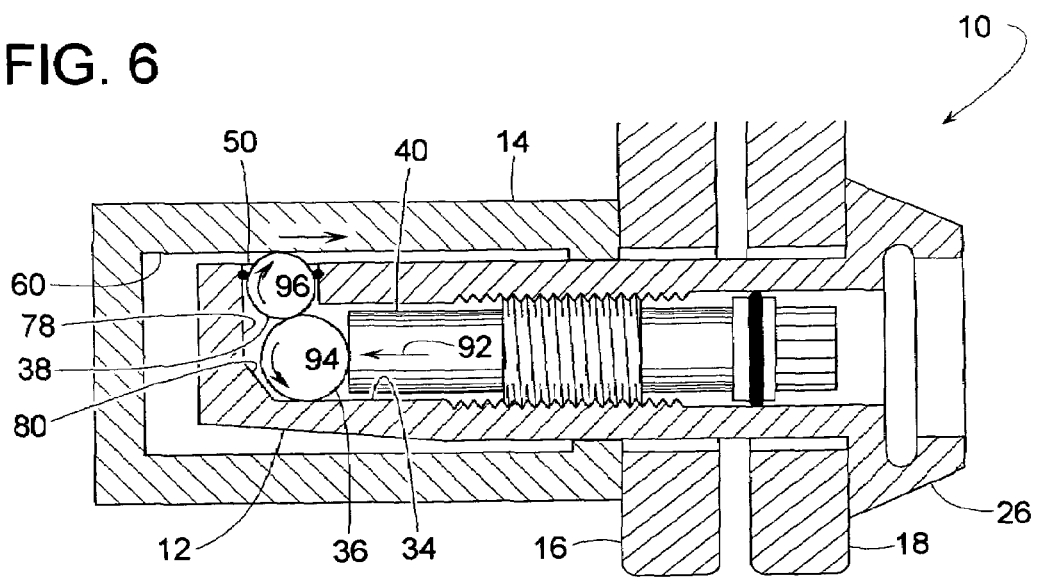
FIG. 6 is similar to FIG. 5 but showing relative motion of the parts.

Referring to FIG. 6, driven ball 38 not only helps bind shank 12 to retainer 14, ball 38 may also actually help draw shank 12 in an axial direction 92 into retainer 14 as pin 40 is screwed into shank 12. As pin 40 forces drive ball 36 to roll along one side of bore 34, drive ball 36 may roll in a counterclockwise direction 94. Friction between balls 36 and 38, thus urges driven ball 38 to rotate in a clockwise direction 96. As driven ball 38 rolls in clockwise direction 96 along inner wall 60, the traction between driven ball 38 and wall 60 tends to draw shank 12 further into retainer 14, thereby tightly clamping parts 16 and 18 between head 26 and retainer 14.

In comparing FIGS. 5 and 6, it should be noted the effect that angled cam surface 80 has on balls 36 and 38. As pin 40 is screwed into shank 12, pin 40 initially pushes drive ball 36 in a generally straight line along bore 34. After drive ball 36 reaches angled surface 80 of end stop 78, surface 80 redirects drive ball 36 more directly toward side hole 50, whereby drive ball 36 gives driven ball 38 an extra push through side hole 50 just before drive ball 36 reaches an ultimate termination point 98 of end stop 78. Giving driven ball 38 an extra push near the end of its travel increases the extent to which driven ball 38 can protrude from shank 12, which can increase the relative tilting and binding between shank 12 and retainer 14.

Figure 7:
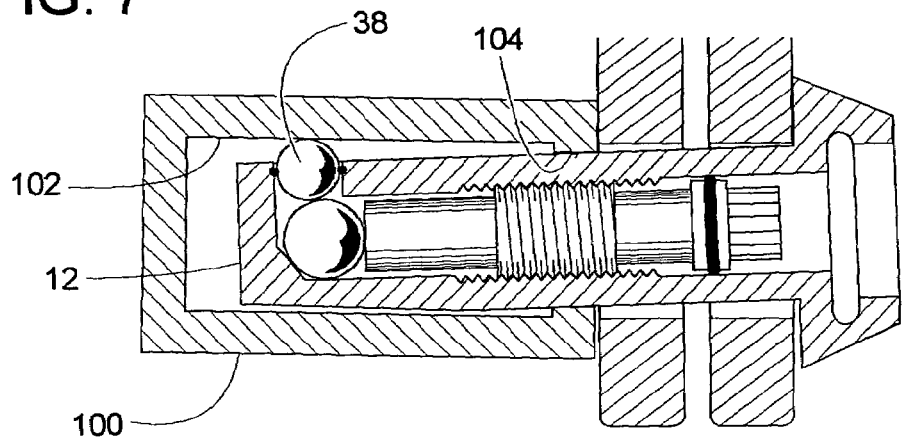
FIG. 7 is a cross-sectional view similar to FIG. 3 but showing another barrel lock embodiment.

FIG. 7 shows a retainer 100 whose inner wall 102 (retainer bore) and/or throat 104 has a Brinell hardness of at least 230. With such hardness, it may not be necessary for driven ball 38 to form a dimple in retainer 100. Instead, shank 12 can be locked to retainer 100 solely by binding forces created between shank 12 and throat 104 as driven ball 38 forces shank 12 to tilt relative to retainer 100.

Figure 8:
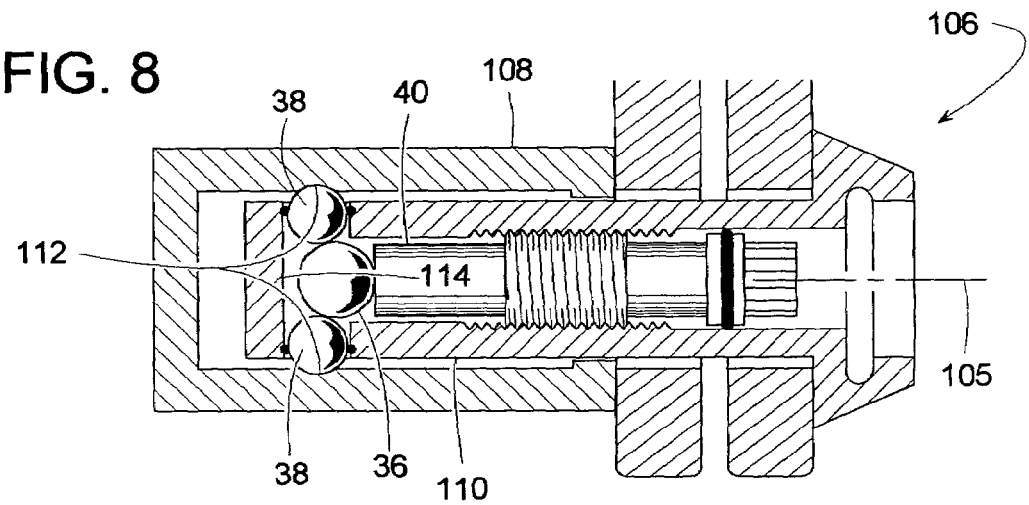
FIG. 8 is a cross-sectional view similar to FIGS. 3 and 7 but showing yet another barrel lock embodiment.
Figure 8A:
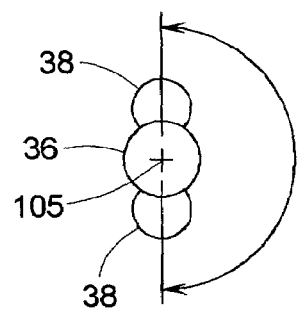
FIG. 8a shows one possible arrangement for the balls of the barrel lock of FIG. 8.

FIG. 8 shows an alternate barrel lock 106 that includes two or more driven balls 38 that lock a retainer 108 to a shank 110 by forming a corresponding two or more dimples 112. To prevent balls 38 and 36 from locking over center, the axial movement of drive ball 36 can be limited by a generally linear end stop 114 that prevents pin 40 from forcing ball 36 directly between and inline with balls 38 (i.e., all three balls being inline). When driven balls 38 are directly opposed and distributed 180-degrees about a centerline 105 of ball 36, as shown in FIG. 8a, the linearity of end stop 114 can be created by the side wall of a through hole that is drilled to create the two side holes through which driven balls 38 protrude. Since ball 36 is preferably larger than driven balls 38, the center points of the three balls will be displaced out of collinear alignment when all three balls are up against end stop 114.

Figure 8B:
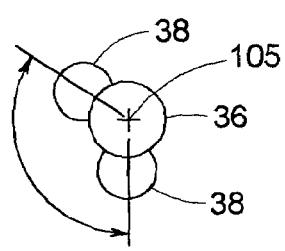
FIG. 8b shows another possible arrangement for the balls of the barrel lock of FIG. 8.

In some cases, however, it may be desirable to have driven balls 38 nonconcentrically distributed about centerline 105 at, for example, 120-degrees apart as shown in FIG. 8b. Multiple driven balls that can each protrude a given distance can provide shank 110 with an overall greater change in its extendable outside dimension, whereby the stepped throat of retainer 108 could possibly be omitted and replaced by providing retainer 108 with a tapered bore whose diameter increases with its depth. Having driven balls 38 distributed nonconcentrically, can provide shank 110 with a tilting or binding effect that was explained with reference to barrel lock 10 of FIGS. 1-6.

Figure 9:
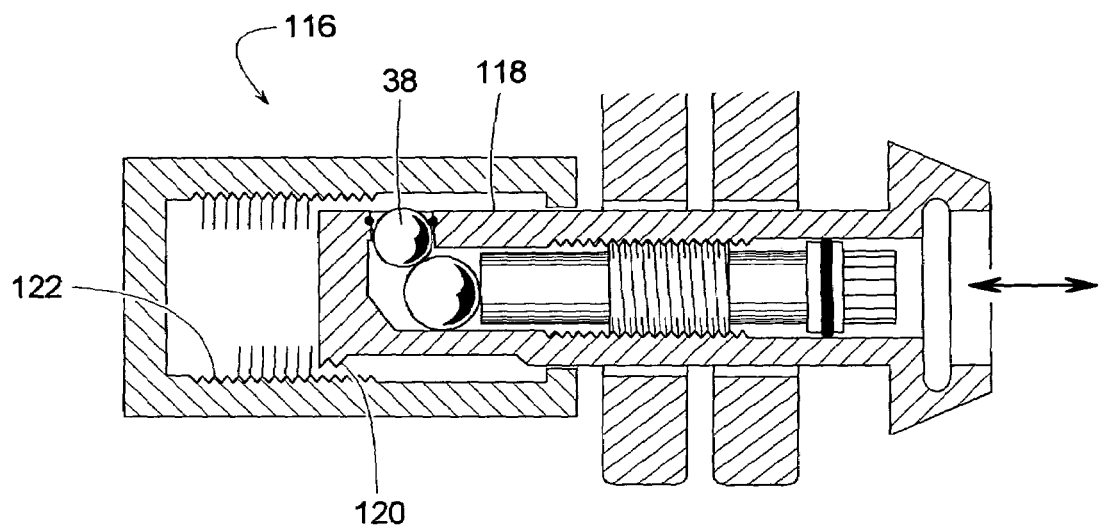
FIG. 9 is a cross-sectional view of another barrel lock embodiment in an unlocked position.
Figure 10:
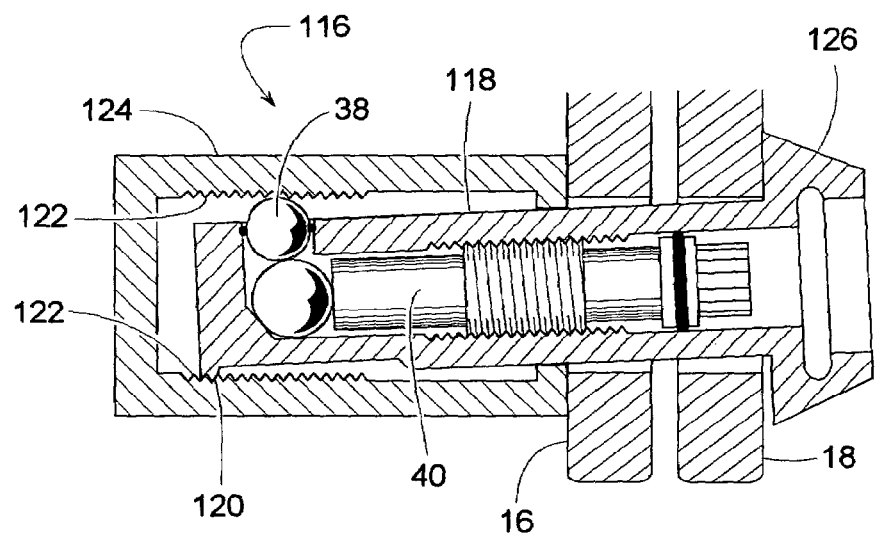
FIG. 10 is a cross-sectional view similar to FIG. 9 but showing the barrel lock in a locked position.

FIGS. 9 and 10 show a barrel lock 116 whose shank 118 includes a tooth 120 for engaging internal threads 122 or some other type of spiral groove within a retainer 124. FIG. 9 shows barrel lock 116 in its unlocked position where driven ball 38 is retracted so that shank 118 can be readily inserted or removed from within retainer 124. In the locked position, as shown in FIG. 10, driven ball 38 is pushed outward against threads 122, which tilts shank 118 and forces tooth 120 into positive engagement with threads 122, thereby preventing shank 118 from being withdrawn from within retainer 124. To adjust the axial spacing between a head 126 of shank 118 and an open end of retainer 124, drive pin 40 can be just lightly tightened initially so that driven ball 38 and tooth 120 only lightly engage threads 122. Light engagement with threads 122 allows shank 118 and retainer 124 to be screwed together so that head 126 and retainer 124 clamp against parts 16 and 18. Once barrel lock 116 is axially adjusted, it can be locked in place by tightening drive pin 118.

Figure 11:
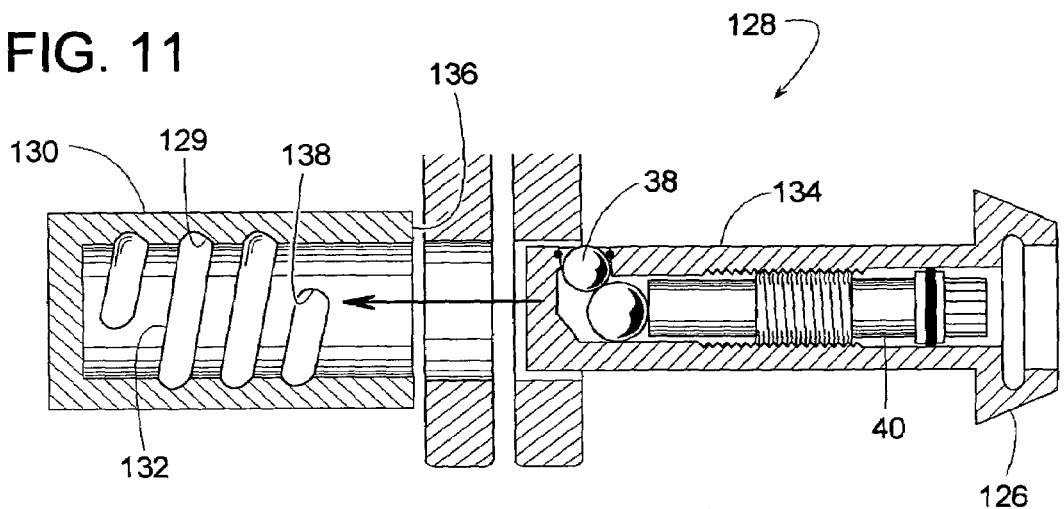
FIG. 11 is a cross-sectional view of another barrel lock embodiment in an unlocked position.
Figure 12:
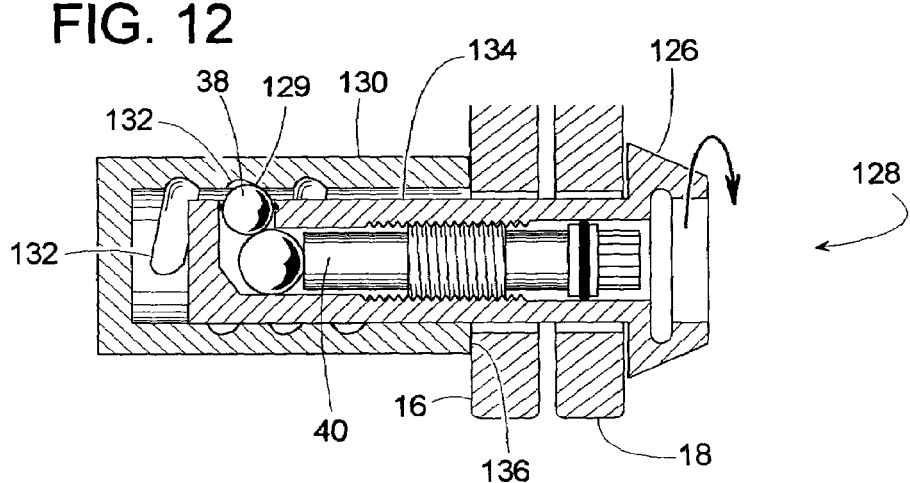
FIG. 12 is a cross-sectional view similar to FIG. 11 but showing the barrel lock in a lightly tightened position.
Figure 13:
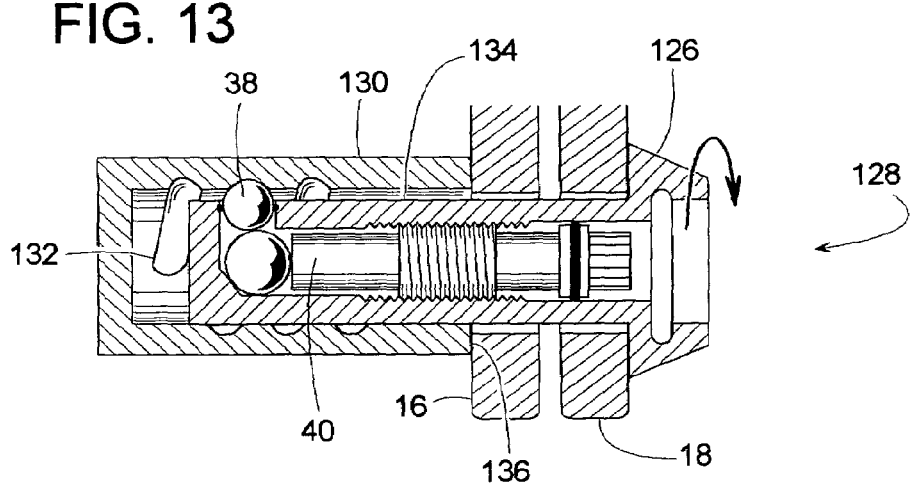
FIG. 13 is a cross-sectional view similar to FIG. 12 but showing the barrel lock in a firmly locked position.

A barrel lock 128 of FIGS. 11-13 is similar to barrel lock 116; however, lock 128 includes a retainer 130 with a spiral groove 132 that is coarser than threads 122, and shank 134 does not necessarily have a tooth for engaging groove 132. Barrel lock 128 is shown unlocked in FIG. 11, snug in FIG. 12, and tightly locked in FIG. 13.

To operate barrel lock 128, driven ball 38 can be retracted so that shank 134 can be inserted into retainer 130, as shown in FIG. 11. Next, drive pin 40 is lightly tightened to gently extend driven ball 38 partially into groove 132. To adjust the axial spacing between head 126 and an open face 136 of retainer 130, shank 134 can be rotated to effectively screw shank 134 into retainer 130, thereby minimizing the axial gap between barrel lock 128 and parts 16 and 18. Once barrel lock 128 is adjusted axially (FIG. 12), drive pin 40 can be tightened so that driven ball 38 "bites" into or tightly grips retainer 130 (FIG. 13). A surface 129 is preferably tapered to prevent that surface from biting into ball 38 and to enhance the ball's ability to draw shank 134 into retainer 130.

If initially shank 134 is just snuggly screwed into retainer 130 while driven ball 38 is only partially extending into groove 132 (FIG. 12), subsequent final tightening of drive pin 40 forces driven ball 38 farther into groove 132 (FIG. 13), which draws retainer 130 and head 126 more tightly together in the axial direction. In addition, barrel lock 128 could incorporate the dimpling effect of the other embodiments described herein. It is also well within the scope of the invention to modify retainer 130 to use a tilting or binding effect between shank 134 and retainer 130 to help hold the two together.

In the illustrated embodiment, however, retainer 130 does not include a throat for binding or for preventing shank 134 from being forcibly pried out from with retainer 130. Instead, retainer 130 includes an obstruction 138 that limits how far driven ball 138 can travel along groove 132, thereby limiting an extent to which shank 134 can withdraw from within retainer 130. For barrel lock 128, obstruction 138 is simply where groove 132 ends; however, obstruction 138 should not limited to this particular example.

Figure 14:
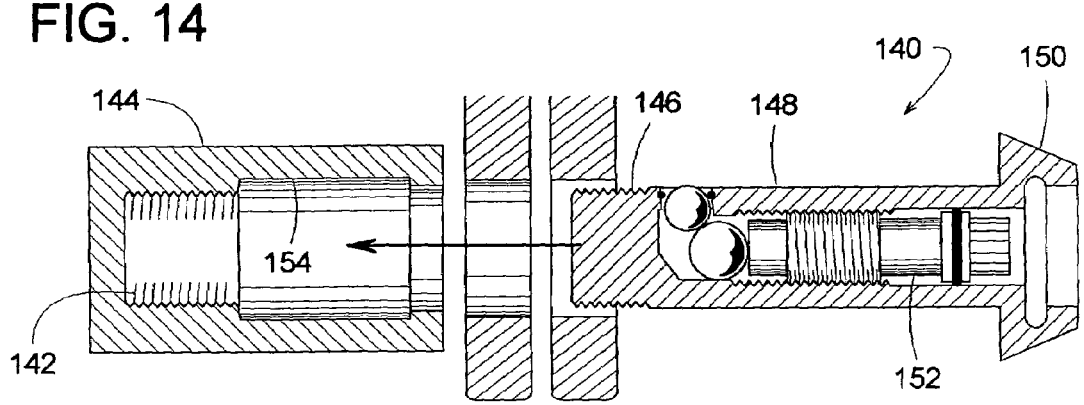
FIG. 14 is a cross-sectional view of another barrel lock showing its shank about to be inserted into its retainer.
Figure 15:
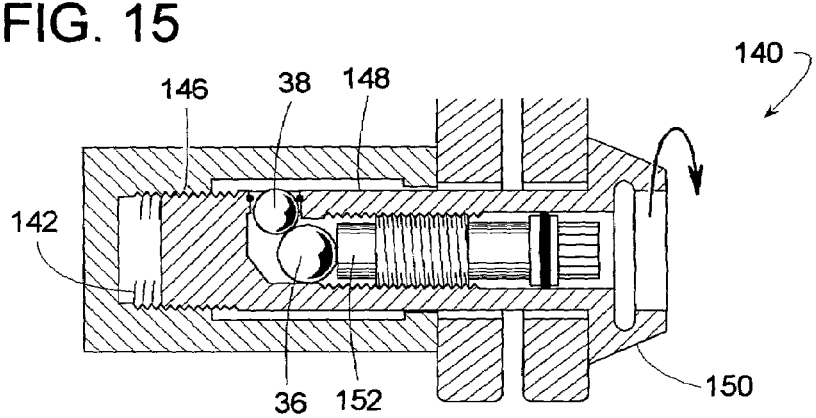
FIG. 15 is a cross-sectional view similar to FIG. 13 but showing the shank being screwed into its retainer to axially adjust the barrel lock.
Figure 16:
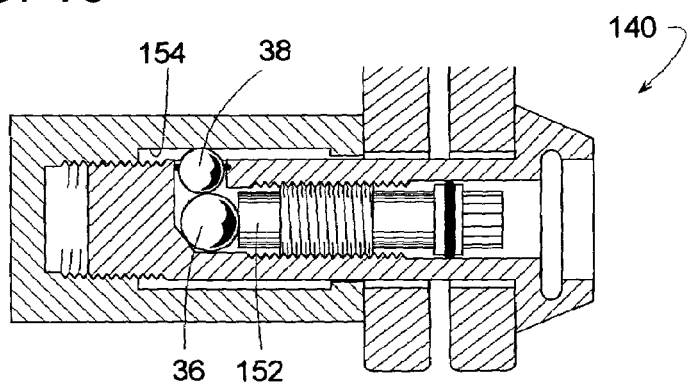
FIG. 16 is a cross-sectional view similar to FIGS. 13 and 14 but showing the shank locked into its retainer.

In another embodiment, shown in FIGS. 14-16, a barrel lock 140 includes a retainer 144 with internal threads 142 and a shank 148 with external threads 146, so the two can be screwed together to adjust the axial distance between retainer 144 and a head 150 of shank 148. Once adjusted, a drive pin 152 acts upon drive ball 36 to force driven ball 38 tightly up against a retainer bore 154 in a manner similar to that of barrel lock 10. The point at which driven ball 38 engages retainer bore 154 is preferably spaced apart from the threads to prevent driven ball 38 from damaging internal threads 142. FIG. 13 shows shank 148 and retainer 144 being assembled, FIG. 14 shows shank 148 being rotated relative to retainer 144 to adjust the axial spacing between retainer 144 and head 150, and FIG. 16 shows barrel lock 140 adjusted and locked in position.

FIGS. 17-22 show how a barrel lock 156 can be used to lock a door panel 158 tightly closed against a box 160, such as conventional electrical enclosures, which are well known to those of ordinary skill in the art. Box 160 and door panel 158 correspond to parts 16 and 18 of the other embodiments. In this example, a clip 162 with two openings 164 helps hold a rectangular retainer 166 adjacent to a flange 168 that frames an access opening 170 of box 160. Retainer 166 includes a retainer bore 172 with a shoulder 174.

Before panel 158 can be locked shut, box 160 needs a hole 176 in flange 168, and panel 158 needs a similar corresponding hole 178. Holes 176 and 178 should be located so that they come into alignment with each other when the door is closed. If box 160 and panel 158 were not originally manufactured with such holes, they can be readily added using a conventional drill or punch.

Figure 17:
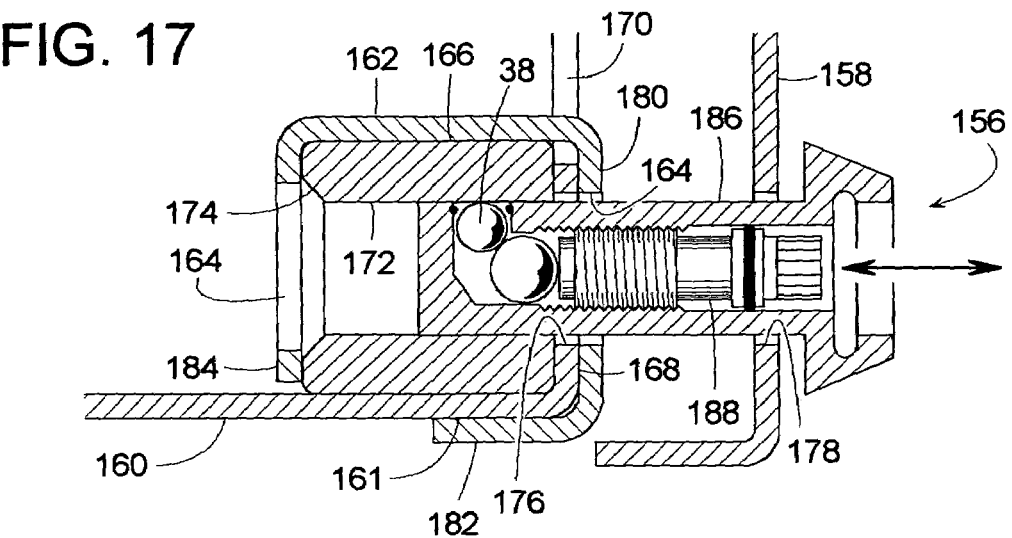
FIG. 17 is a cross-sectional view of yet another barrel lock with its driven ball in a retracted position.
Figure 18:
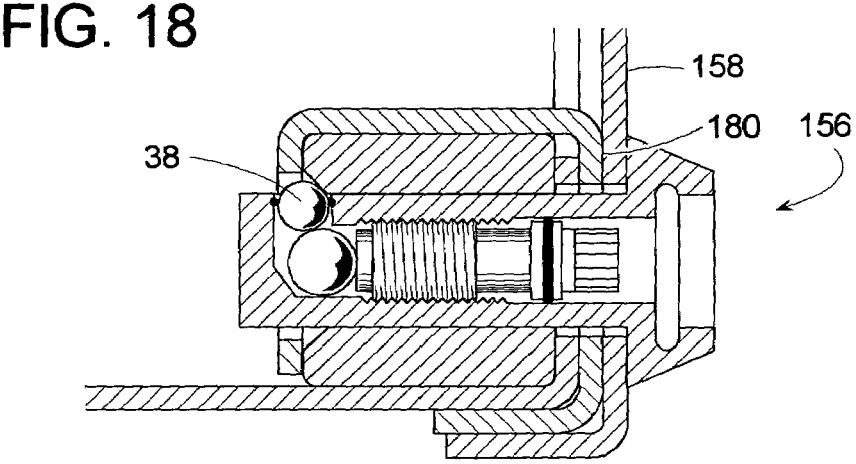
FIG. 18 is a cross-sectional view similar to FIG. 16 but showing the driven ball in an intermediate position.
Figure 19:
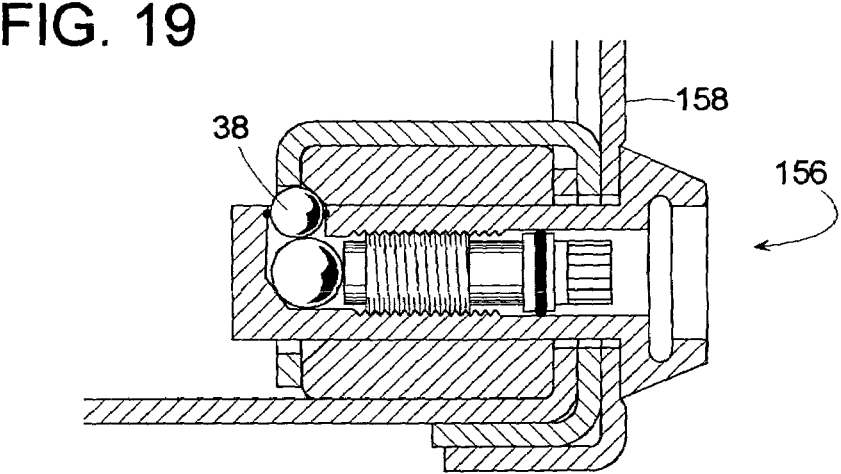
FIG. 19 is a cross-sectional view similar to FIG. 17 but showing the driven ball in an extended position.
Figure 20:
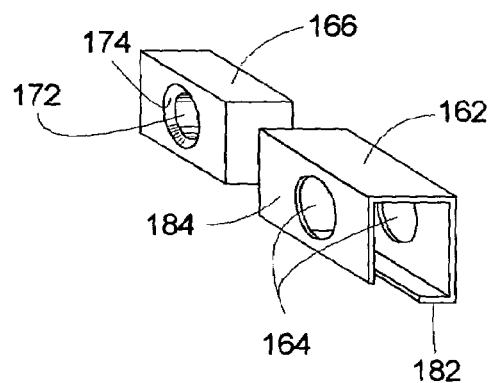
FIG. 20 is a perspective view of a retainer and clip used in the barrel lock of FIGS. 17-19.
Figure 21:
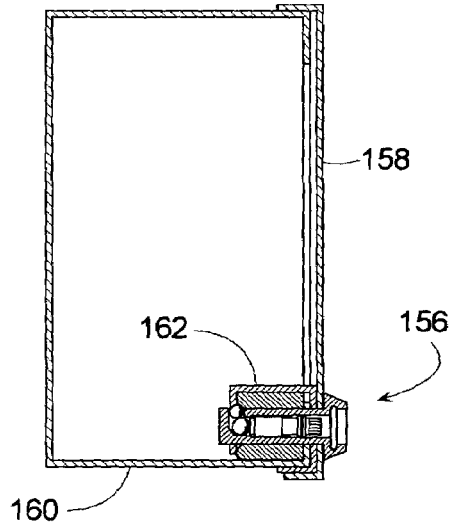
FIG. 21 is a cross-sectional view corresponding to FIG. 19 but showing more of the box.
Figure 22:
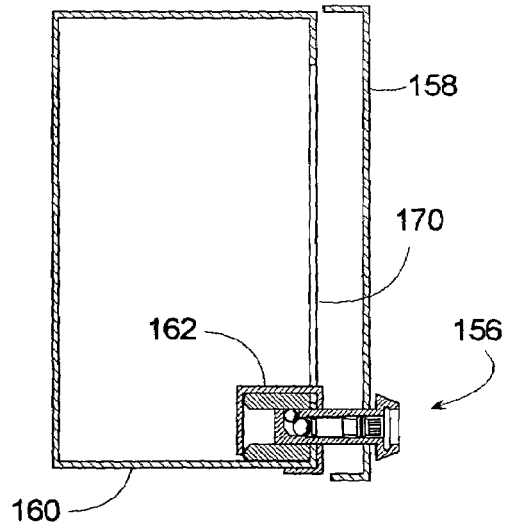
FIG. 22 is a cross-sectional view corresponding to FIG. 17 but showing more of the box.

To lock door panel 158 shut, door 158 is closed with a front face 180 of clip 162 being situated between door 158 and flange 168. A bottom flange 182 of clip 162 can extend underneath or along some side wall 161 of box 160. Flange 182 is preferably harder than the material of box 160 and door 158 to inhibit the door and box from being forcibly pried open. Retainer 162 can be held between front face 180 and a back face 184 of clip 162. When door panel 158 is closed, as shown in FIGS. 18, 19, and 21, a series of inline through holes is created by holes 178, 176, openings 164, and retainer bore 172. A shank 186 with its driven ball 38 in a retracted position, as shown in FIGS. 17 and 22, can be inserted (or removed) through the series of holes. A drive pin 188 can be screwed into shank 186 to force driven ball 38 to an intermediate position (FIG. 18). At the intermediate position, driven ball 38 lightly engages shoulder 174 such that barrel lock 156 exerts a first pressure that pulls door panel 158 closed, but not very tightly. Additional turning of drive pin 188 forces driven ball 38 to protrude farther out to an extended position (FIGS. 19 and 21) so that driven ball 38 presses harder against shoulder 174, which causes barrel lock 156 to exert a second, greater pressure that more forcefully pulls door panel 158 closed. Shoulder 174 is preferably a chamfer whose angled surface promotes an axial door-closing force that increases as ball 38 extends radially.

Although the invention is described with respect to a preferred embodiment, modifications thereto will be apparent to those of ordinary skill in the art. Therefore, the scope of the invention is to be determined by reference to the following claims:

The invention claimed is:
1. A barrel lock, comprising:
a shank defining a threaded bore and a side hole, the shank includes an upper end and a lower end;

a drive pin insertable through the upper end of the shank and threadingly engaging the threaded bore, the drive pin includes a driving end and a driven end that are at opposite ends of the drive pin, the upper end of the shank is closer to the driven end than the driving end;

a driven ball disposed within the shank and being movable to vary an extent to which the driven ball protrudes out the side hole;

a drive ball interposed between the driven-ball and the driving end of the drive pin; and an end stop disposed within the shank at a location where the end stop can be selectively engaged and disengaged by at least one of the drive ball and the drive pin such that when the end stop engages at least one of the drive ball and the drive pin, the driven ball and the drive ball lie along a ball-to-ball line that is at a predetermined minimum angle relative to a radial line, wherein the radial line is perpendicular to the drive pin and the predetermined minimum angle is greater zero degrees and is sufficient to inhibit the drive ball and the driven ball from locking up within the shank.

2. The barrel lock of claim 1, wherein the predetermined minimum angle is less than 15-degrees.

3. The barrel lock of claim 1, wherein the end stop includes an angled surface that guides the drive ball toward the side hole as the drive pin moves closer to the end stop.

4. The barrel lock of claim 1, wherein the driven ball is one of a plurality of driven balls disposed within the shank.

5. The barrel lock of claim 1, wherein the barrel lock includes less than two driven balls.

6. The barrel lock of claim 1, wherein as the drive ball approaches the end stop, the driven ball moves less than 0.004 inches in response to a 90-degree rotation of the drive pin.

7. The barrel lock of claim 1, further comprising a retainer having an inner surface that defines a retainer bore, the shank is disposed within the retainer bore, and the inner surface is softer than the driven ball so that if the driven ball is driven by sufficient force, the driven ball forms a dimple in the inner surface.

8. The barrel lock of claim 1, further comprising a retainer defining a retainer bore with a spiral groove, the shank extends into the retainer bore, and the driven ball extends into the spiral groove.

9. The barrel lock of claim 8, further comprising an obstruction disposed at one end of the spiral groove, wherein, the obstruction limits how far the driven ball can travel along the spiral groove, thereby limiting an extent to which the shank can withdraw from within the retainer.

10. The barrel lock of claim 1, further comprising a retainer defining a retainer bore, the shank extends into the retainer bore and can be selectively tilted between a strained position and a relaxed position, such that in the strained position the shank is inhibited from being withdrawn from within the retainer bore, and in the relaxed position the shank can be more easily withdrawn from within the retainer bore.

11. The barrel lock of claim 1, further comprising:
a retainer that defines a retainer bore and internal threads; and
external threads disposed on the shank, wherein the external threads engage the internal threads, the driven ball is radially movable to selectively engage and release the retainer bore, and the driven ball is spaced apart from the internal threads.

12. A barrel lock assembly comprising:
a box that includes a flange, wherein the flange extends between a side wall of the box and an access opening of the box;
a door panel that is movable to selectively open and cover the access opening of the box;
a retainer disposed within the box, wherein the retainer defines a retainer bore and a shoulder that are inside the box;
a clip attached to the box so as to overlap the flange and the side wall to help hold the retainer to the box;
a shank defining a threaded bore and a side hole;
a head disposed on the shank;
a drive pin threadingly engaging the threaded bore and being movable between a locked position and an unlocked position; and
a driven ball disposed within the side hole of the shank and being movable to vary an extent to which the driven ball protrudes out the side hole in response to the drive pin moving between the locked position and the unlocked position, the driven ball is selectively movable to an extended position, a retracted position, and an intermediate position such that:
 a) when the driven ball is in the intermediate position, the driven ball engages the shoulder so that the door panel and the flange of the box can be clamped at a first pressure between the retainer and the head of the shank;
 b) when the driven ball is in the extended position, the driven ball engages the shoulder so that the door panel and the flange of the box can be clamped at a second pressure between the retainer and the head of the shank, wherein the second pressure is greater than the first pressure; and
 c) when the driven ball is in the retracted position, the driven ball disengages the shoulder so that the shank can be withdraw from within the retainer bore, and the door panel can be moved away from the flange of the box.

13. The barrel lock of claim 12, wherein the shoulder includes an angled surface that lies at an incline to a longitudinal centerline of the retainer bore.

14. The barrel lock of claim 12, wherein the clip is harder than the flange of the box.

15. A barrel lock, comprising:
a shank defining a shank bore and a side hole;
a drive pin disposed within the shank bore and being selectively movable between a lock position and an unlock position;
a driven ball disposed within the shank and being movable from a retracted position to an extended position in response to the drive pin moving from the unlock position to the lock position; and
a retainer defining a retainer bore and a throat that are both sized for receiving the shank, the throat has a threat diameter, the retainer bore has a bore diameter, and the throat diameter is smaller than the bore diameter, the driven ball when in the extended position presses against the retainer bore which forcibly tilts the shank relative to the retainer to create a binding force between the shank and throat, wherein the binding force resists relative axial movement between the shank and the retainer, and the driven ball when in the retracted position allows the shank to relax within the retainer bore to reduce the binding force and permit relative axial movement between the shank and the retainer.

16. The barrel lock of claim 15, wherein a surface of the retainer bore is softer than the driven ball.

17. The barrel lock of claim 15, wherein the retainer bore has a surface with a Brinell hardness of at least 230.

18. The barrel lock of claim 15, wherein the throat of the retainer has a surface with a Brinell hardness of at least 230.

19. A barrel lock method, comprising:
- inserting a metal shank into a bore of a metal retainer, wherein the metal shank contains a driven ball, the metal shank has a maximum outside diameter, and the bore has a minimum inside diameter that is greater than the maximum outside diameter to create an annular clearance therebetween;
- forcing the driven ball to protrude from the metal shank;
- pressing the driven ball against the metal retainer;
- forming a dimple into the metal retainer by pressing the driven ball against the metal retainer;
- inhibiting the separation of the metal shank and the metal retainer by virtue of the driven ball engaging the dimple;
- subsequently withdrawing the driven ball from within the dimple; and
- withdrawing the metal shank from within the metal retainer.

20. The barrel lock method of claim 19, wherein the metal shank contains a drive ball and the barrel lock method further comprises pressing the drive ball against the driven ball to facilitate the step of pressing the driven ball against the metal retainer.

* * * * *